S. J. REED.
Plow Fender.
No. 83,999.
Patented Nov. 10, 1868.
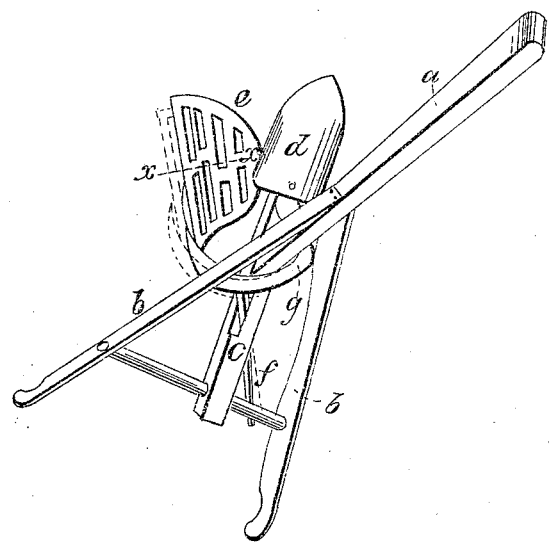
Witnesses
Inventor.

SAMUEL J. REED, OF MIDDLETOWN, OHIO.

Letters Patent No. 83,999, dated November 10, 1868.

IMPROVEMENT IN PLOW-FENDERS.

The Schedule referred to in these Letters Patent and making part of the same.

*To all whom it may concern:*

Be it known that I, SAMUEL J. REED, of Middletown, in Butler county, Ohio, have invented certain new and useful Improvements in Fenders for Plows; and I do hereby declare that the following is a full and exact description thereof, reference being had to the accompanying drawings, and to the letters of reference marked thereon.

The drawing represents a perspective view of a shovel-plow with my improved fender attached thereto.

The object of my invention is to provide a device which can be attached to corn-plows of all descriptions, so constructed and arranged as to protect the plants being cultivated from clods of earth, and at the same time permit the fine earth to pass through it, as hereinafter more fully specified.

In the accompanying drawings, $a$ denotes the plow-beam; $b\ b$, the handles; $c$, the standard; $d$, the plow-share; $e$, the fender; and $f$, the oscillating lever.

I am aware that slotted fenders for protecting plants from clods of earth, when being cultivated, have been attached to plows, and arranged to stand rigidly in vertical planes. Some of these protectors or fenders have been constructed with slots or perforations, while others have been formed as perfectly plain metal sheets or plates, and in either case these fenders have been attached by means of considerable mechanism.

To avoid the objections always attendant upon an expensive and complicated mechanism, I have constructed my fender of a single piece of sheet-metal, a portion of which serves as a means of attaching it to the plow, and forms an elastic or yielding connection.

The body of the fender $e$ may be slotted, as represented in the drawing, or perforated, to permit the pulverized earth to freely pass through it; and its bent or curved shank serving as a yielding fastening-strap, $g$, is connected to standard $c$ by the same bolt and nut that secure the plowshare $d$ to the standard. The body $e$ of the fender is curved upwards, so as to form a receptacle for the earth and clods thrown up by the plowshare $d$, and the fender is so arranged, diagonally in relation to the line of the plow-beam, that the clods of earth received by it will be conducted backwards, in rear of the plowshare $d$, instead of being crowded between the fender and the share $d$, as is often the case in the use of vertically-arranged fenders.

The transverse sectional line $x\ x$, marked on the drawing, indicates the direction of the curved or circular form into which the fender is bent. A slot is formed through the standard $c$, in which lever $f$ is pivoted. The front end of this lever extends under the strap $g$, and its rear end extends in the direction of the right-side handle of the plow, and in convenient position for the plowman to grasp it, from time to time, to agitate or shake the fender $e$, to cause damp earth to pass through it, and to discharge any adhering clods into the furrow behind the plow. The lever $f$ will also serve to elevate the fender, to pass over stones or other obstructions in the line of its travel.

By the use of my fender, the corn or other plants being cultivated are completely protected from clods, &c., and the plow may be drawn in close proximity to the plants, without any risk of injuring them.

The yielding or spring-strap $g$ is suitably curved, and bent to pass over the beam $c$, as indicated in the drawing, but its end may be attached in rear of the standard, by the same bolt, and in that case it will not pass over the beam $c$, but will occupy a position in rear of the standard and beam.

Having fully described my invention,

What I claim, and desire to secure by Letters Patent, is—

The curved fender $e\ g$, in combination with lever $f$, constructed, arranged, and connected with a plow, in the manner and for the purpose substantially as described.

In testimony whereof, I have hereunto set my hand, this 15th day of July, A. D. 1868.

SAMUEL J. REED.

Witnesses:
A. G. KOHRER,
J. E. SMITH.